INVENTOR.
ERNST G. FRANKEL

United States Patent Office 3,513,797
Patented May 26, 1970

3,513,797
ENERGY-ABSORBING BEACH FOR SHIP'S WELLS AND TANKS
Ernst G. Frankel, Boston, Mass., assignor to Litton Systems, Inc., Beverly Hills, Calif., a corporation of Maryland
Filed Aug. 21, 1968, Ser. No. 754,214
Int. Cl. B63b 43/06
U.S. Cl. 114—125                                1 Claim

ABSTRACT OF THE DISCLOSURE

A beach device which traps and absorbs the energy produced by a moving liquid disposed in a container, tank or well structure. The device includes a perforated material for guiding the moving liquid onto a ramp surface and into engagement with a structure disposed underneath the ramp, which structure has resilient properties and a multitude of surfaces for substantially deflecting, dissipating and absorbing the energy.

FIELD OF THE INVENTION

This invention relates to an improved device for reducing the waves and currents of a liquid and, more particularly, relates to a ramp or beach structure in a ship's tank or well for absorbing the impact energy resulting from the movement of the liquid in the tank.

DESCRIPTION OF THE PRIOR ART

Ships of practically every type encounter the problem of undesirable ship motion caused by sea and weather conditions. Depending upon the type and size of the ship and operation conditions to which the ship is to be subjected, various hull designs with stabilizing improvements are selected to counteract the tendency of the water to impart motion to the ship. However, due to the great number of variables present and since cyclic-wave motion could cause a gradual increase in the energy of motion of the ship, the hull design provides only a limited effect in controlling the ship motion. Thus, regardless of the above-mentioned known stabilizing improvements to ship hull designs, certain undesirable ship motions will still exist, especially under rought weather conditions.

Also, in the past only large ships were built for transporting of passengers. However, now it has been proven through economic circumstances to be more profitable to build large cargo-carrying vessels such as tankers or freighters. Thus, in accordane with the above reasonings, stabilization of a vessel does not eliminate all undesirable motion; and by building larger vessels, the subsequent inherent strength requirements, operational forces, movements and other parameters are increased also, particularly where large volumes of liquid are kept in tanks or wells.

For instance, every marine vessel has a plurality of tanks or wells for carrying certain liquids such as fuel, oil, water, etc., and in vessels carrying liquids as a cargo, the tanks or wells are quite large, occupying most of the hold area of the vessel. Some tanks are completely enclosed, while other might be open such as in fishing boats where large wells or tanks are used for storing fish, which are partially open to the sea. Similarly flooded wells, open to the sea at the aft end or stern of the ship, are often used to provide for safe handling of lighters and barges.

The present invention, as described below, will reduce or eliminate the transverse or longitudinal reflecting waves or currents in a partially or totally enclosed ship's well or tank. The water in such a tank, if open to the sea, may be subjected to environmental and self-generated wave effects, causing reflecting waves and currents which may result in wave buildup and standing waves preventing effective operation in the tank and causing major impacts or demage to the tank's structure of components contained therein. Similarly, water in such a well would be affected by the ship's motion resulting in various responses in the bottom and sides of such a well due to the ship's heave, roll, pitch and surge motion. These latter effects are in existence in an enclosed, as well as in a partially open, well and similarly result in large reflected wave and current effects if a free surface is maintained in such a well.

In order to prevent the aforementioned disadvantages and problems, the present invention comprises an energy-absorbing device which can easily be fitted to one or more ends of a well or tank to dissipate wave and current energy and substantially eliminate or absorb the reflecting waves or currents. The construction of the energy-absorbing device is rather simple and can be compared to a beach which may be, but does not have to be, built to partly slope above and underneath the liquid surface. The width and depth relationship of the device or beach and the degree of the slope are a function of the water depth, wave length and significant wave energy. Thus, the energy-absorbing device can be designed for effective wave and current attenuation for a wide range of wave length, amplitude and resulting energy spectrums. For ease of description, the energy-absorbing device will be referred to as simply "the device" hereinafter.

In short, the construction of the device comprises a perforated enclosure which resembles and acts to the moving liquid as a beach or a ramp, and a structure positioned underneath the beach or ramp which includes multi-surface reflecting parts made of steel, aluminum or synthetic materials which are disposed in an at-random fashion or are positioned in a regular predetermined type of construction. The device is mounted inside of the tank to one of more of its sides, for instance, and typically of a volume relatively small compared to the tank volume.

It is accordingly an object of the present invention to provide a device which prevents the buildup of waves and current of a liquid in a tank which is subjected to motion.

It is another object of the present invention to provide a fluid energy-damping device which has a volumetric capacity relatively small compared to that of a tank in which it is positioned.

It is another object of the present invention to provide a device which protects the structure and other internal components of a tank by damping the motion energy of a liquid in the tank.

It is another object of the present invention to provide a device which eases liquid wave amplitudes into a lower value by the extraction of energy by turbulent action and absorption.

SUMMARY OF THE INVENTION

Briefly stated and in accordance with the preferred embodiment of the present invention, the device comprises a perforated sheet of material placed in a sloping position, thereby intersecting the mean liquid surface formed into a permeable structure and a plurality of mult-surfaced structures or members positioned underneath the sheet of perforated material. The device is so constructed that the perforated material guides the moving liquid onto its ramp structure and through the perforations in order to trap the moving liquid underneath the ramp. This results in a de-energizing of the liquid and a dissipation and absorption of the wave and current energy of the moving liquid.

BRIEF DESCRIPTION OF THE DRAWINGS

Other objects, features and advantages of the invention will become apparent in the following description taken in conjunction with the drawings wherein.

DESCRIPTION OF THE PREFERRED EMBODIMENTS

Figure 1:
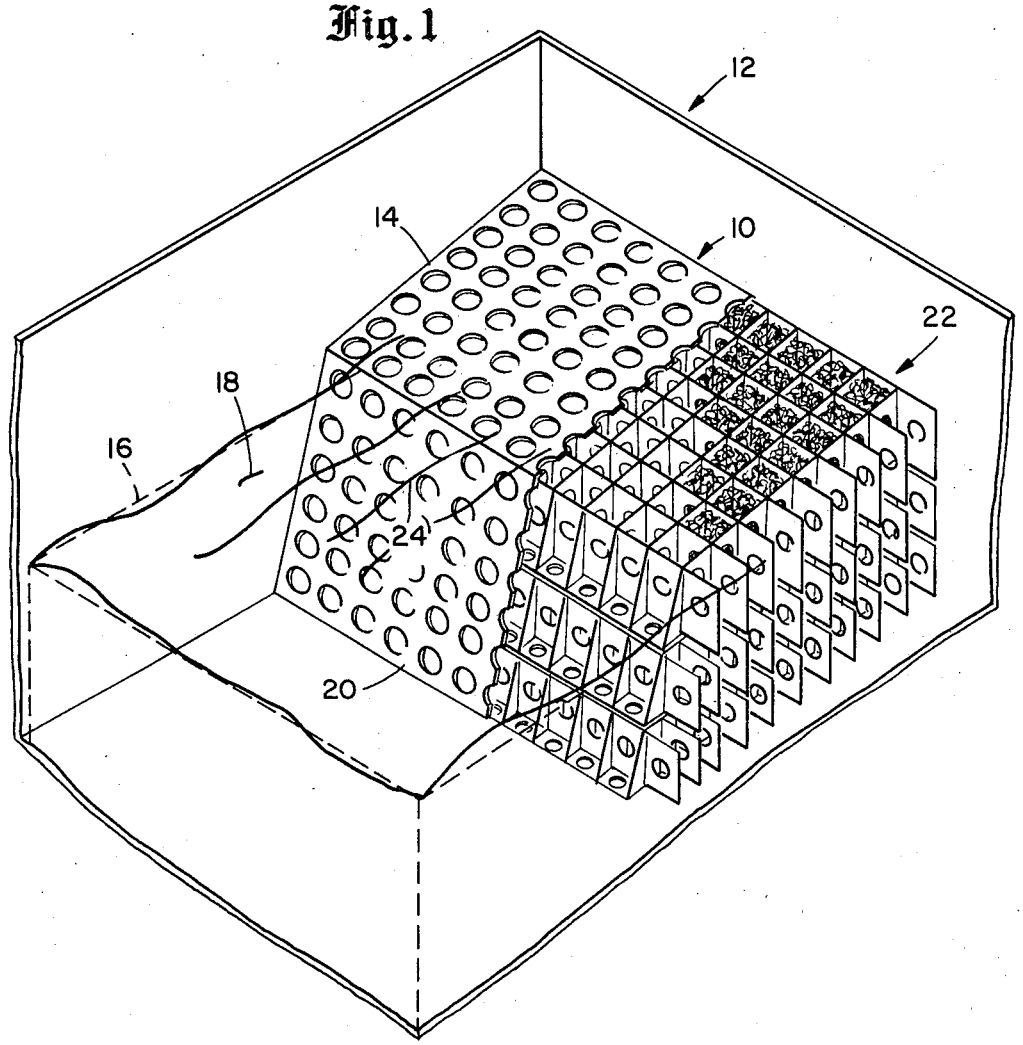
FIG. 1 illustrates, in a perspective fashion, a portion of the device constructed according to the principles of this invention shown installed in a well or tank and, in addition, discloses a cut-away view of the internal structure of the device wherein, for clarity, the multi-surfaced members are shown only in a portion of the cells of the device.

Referring to FIG. 1, in detail there is shown a portion of the device 10 arranged in a well or tank 12 which comprises at least one perforated sheet of material 14 which is slopingly positioned in regard to the mean liquid surface 16 of the liquid 18 in the well 12. As further shown in this preferred embodiment of the invention, a second perforated sheet of material 20 complements the sheet 14 and is also positioned obliquely with respect to the mean liquid surface 16.

As should be understood, the number of perforated sheets and their sloping position and also the width and depth relationship are a function of liquid dept, wave length and energy of the moving liquid 18 which varies for each different well structure in order to comply with a most effective design. The sloping orientation of the sheets and its measurements are immaterial as far as the principle of the invention is concerned.

Underneath the perforated sheets 14 and 20 is a structure 22 which comprises a plurality of multi-surface pieces of resilient materials, which structure acts as a temporary trap to the liquid 18 and which structure is the major moving liquid, de-energizing means for the device 10. If desired, the pieces of resilient material may be interconnected.

In the preferred embodiment of FIG. 1, the structure 22 comprises a regular arrangement of resilient or flexible, or spring-like, pieces of material such as a mesh; however, a variety of structural arrangements as well as various materials can be used. Also, if desired, a random deposited number of shavings and/or scrap materials, plastics or of artificially generated multi-surface volumes with inherent flexibility properties can be used for the structure 22, and these may be held in the compartments of the structure by the wire mesh.

Figure 2:
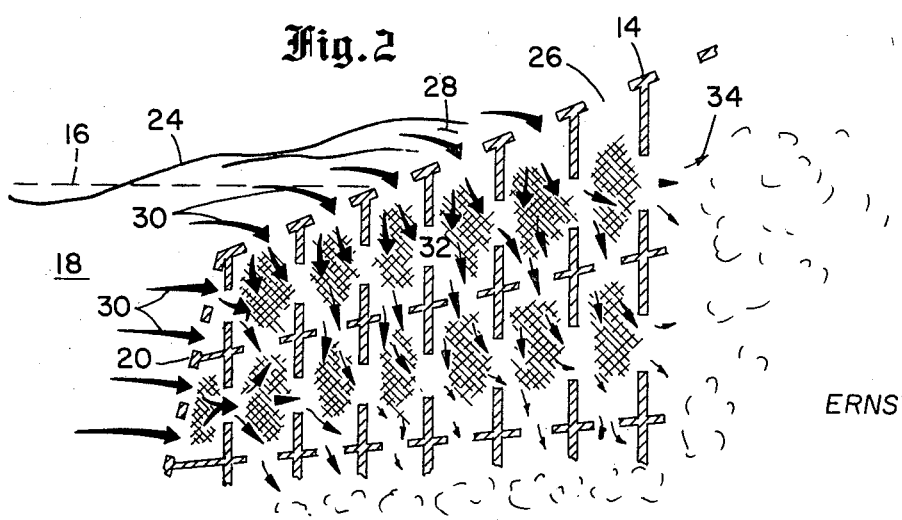
FIG. 2 is a diagrammatic view of the device illustrating the dissipation of the energy in the liquid.

As shown in FIG. 2, the sloping perforated sheet 14 acts as a beach or ramp for the moving liquid waves 24 of the liquid 18 moving energy components shown as arrows 30 and acts as a first energy-reducing means by letting the wave lose its speed when moving upwards on the ramp surface and, further, by its substantial non-reflecting design. Furthermore, the perforations or holes 26 provide an entrance to the liquid 18 to trap the liquid and dissipate the energy components. As soon as the liquid enters the structure 22 underneath the sloping sheet or ramp 14, the moving energy of the liquid will dissipate by the multitude of reflecting surfaces into random reflection directions, as shown by the arrows 32, which experience is repeated again and again for each individual dissipated current and wave, as shown by the smaller-sized arrows 34, so that finally the reflection of the wave or current is substantially eliminated. In addition, the large amount of turbulence generated in the energy-absorbing structure 22 produces a churning action with the various pieces of material which results in substantially complete dissipation of the liquid energy.

Thus, as explained above, the device appears to have an important qualification for use in open or closed ships' wells and tanks. However, it will be obvious that various other applications exist where, for instance, large volumes of liquid having a substantially free surface are transported in vehicles, which transportation induces disturbances to the liquid surfaces resulting in impacts having possible damaging effects to the surrounding structures.

Also, the device 10 has been illustrated as being installed at one side, inside a tank structure. However, a tank could have a similar device installed across its bottom surface area or at any other preferred location.

Therefore, while there has been disclosed what presently appears to be a preferred embodiment of the invention, it should be understood that changes and modifications can be made therein without departing from the essential spirit of the invention.

What is claimed is:
1. A device for controlling the energy resulting from the movement of a liquid in a well, comprising:
    (a) a sheet of perforated material slopingly intersecting the mean liquid surface of a moving liquid so as to define a ramp structure for the moving liquid;
    (b) a permeable structure partially enclosed by and positioned underneath and adjacent said perforated material for receiving said moving liquid after it has passed through said perforated material, said permeable structure having a labyrinthical type of design of a plurality of flexible and multi-surface reflecting areas for dissipating, deflecting and absorbing said movement of said received liquid and further including a quantity of irregularly mixed shavings of a multi-surfaced resilient material disposed between said multi-surfaced reflecting areas; and
    (c) means for draining said liquid from said permeable structure after its movement has been substantially reduced by said reflecting areas and said resilient material thereby preparing said structure to receive additional liquid from said sloping sheet of perforated material.

References Cited

UNITED STATES PATENTS

| 1,844,484 | 2/1932 | Smith | 61—4 |
| 3,349,743 | 10/1967 | Field et al. | 114—125 |
| 3,431,734 | 3/1969 | Vattuone | 61—4 |

TRYGVE M. BLIX, Primary Examiner

U.S. Cl. X.R.

61—4

UNITED STATES PATENT OFFICE
CERTIFICATE OF CORRECTION

Patent No. 3,513,797      Dated May 26, 1970

Inventor(s) ERNST G. FRANKEL

It is certified that error appears in the above-identified patent and that said Letters Patent are hereby corrected as shown below:

In column 1, after FIELD OF THE INVENTION, at line 25, insert--

"The invention herein described was made in the course of, or under contract or subcontract thereunder with the United States Department of the Navy."

In column 1, line 46, "rought" should be -- rough --

In column 3, line 28, "dept," should be -- depth, --

Signed and sealed this 10th day of April 1973.

(SEAL)
Attest:

EDWARD M. FLETCHER, JR.
Attesting Officer

ROBERT GOTTSCHALK
Commissioner of Patents